(12) United States Patent
Kawai et al.

(10) Patent No.: US 7,690,876 B2
(45) Date of Patent: Apr. 6, 2010

(54) CLIP

(75) Inventors: Yasuhiro Kawai, Toyohashi (JP); Toshinori Kakehi, Toyohashi (JP)

(73) Assignee: Newfrey LLC, Newark, DE (US)

( * ) Notice: Subject to any disclaimer, the term of this patent is extended or adjusted under 35 U.S.C. 154(b) by 54 days.

(21) Appl. No.: 11/337,477

(22) Filed: Jan. 24, 2006

(65) Prior Publication Data

US 2006/0171793 A1    Aug. 3, 2006

(30) Foreign Application Priority Data

Jan. 25, 2005    (JP) .............................. 2005-016585

(51) Int. Cl.
*F16B 13/06*    (2006.01)
(52) U.S. Cl. .................. 411/45; 292/DIG. 37
(58) Field of Classification Search .................. 411/41, 411/45–48; 292/DIG. 37
See application file for complete search history.

(56) References Cited

U.S. PATENT DOCUMENTS

| 2,657,894 | A | * | 11/1953 | Sklenar ........................ 248/239 |
| 3,232,161 | A | * | 2/1966 | Fernberg ....................... 411/41 |
| 3,606,814 | A | * | 9/1971 | MacKenzie ................. 411/80.2 |
| 4,114,509 | A | * | 9/1978 | Poe ........................... 411/80.2 |
| 4,405,272 | A | * | 9/1983 | Wollar .......................... 411/41 |
| 4,537,542 | A | * | 8/1985 | Pratt et al. ..................... 411/55 |
| 4,665,285 | A |   | 5/1987 | Shiraishi .................... 200/61.62 |
| 4,741,548 | A | * | 5/1988 | Schlanger ................ 280/288.4 |
| 5,902,083 | A |   | 5/1999 | Hwang |
| 6,514,024 | B2 | * | 2/2003 | Akema et al. ................. 411/48 |
| 6,616,479 | B1 |   | 9/2003 | Jones |
| 6,979,162 | B2 | * | 12/2005 | Kato ....................... 411/371.1 |
| 7,207,759 | B2 | * | 4/2007 | Kato ........................... 411/45 |
| 2004/0109737 | A1 | * | 6/2004 | Kato ........................... 411/55 |
| 2004/0136812 | A1 |   | 7/2004 | Kawai et al. |
| 2005/0062263 | A1 |   | 3/2005 | Kawai et al. |
| 2005/0152765 | A1 |   | 7/2005 | Kato |

FOREIGN PATENT DOCUMENTS

| EP | 0545158 A | 6/1993 |
| EP | 0682186 A | 11/1995 |
| EP | 1473470 A | 11/2004 |
| JP | 61-66011 | 5/1986 |
| JP | 2001-124022 | 8/2001 |

\* cited by examiner

*Primary Examiner*—Flemming Saether
(74) *Attorney, Agent, or Firm*—Stephen R. Valancius; Michael P. Leary

(57) ABSTRACT

A clip comprises a pin having a flange and a shank and a bush having a flange and a hollow shank into which the pin shank is inserted. The clip is configured so that the pin and bush can be temporarily connected, and the bush shank can be inserted into a mounting hole in a workpiece such as a panel while the pin and bush are temporarily connected. When the pin shank is further inserted into the bush shank, the bush shank expands to fix the clip to the workpiece. The bush flange has a wall extending to about the level of the pin flange when the pin and the bush are temporarily connected so as to shield the pin flange and the pin shank.

23 Claims, 4 Drawing Sheets

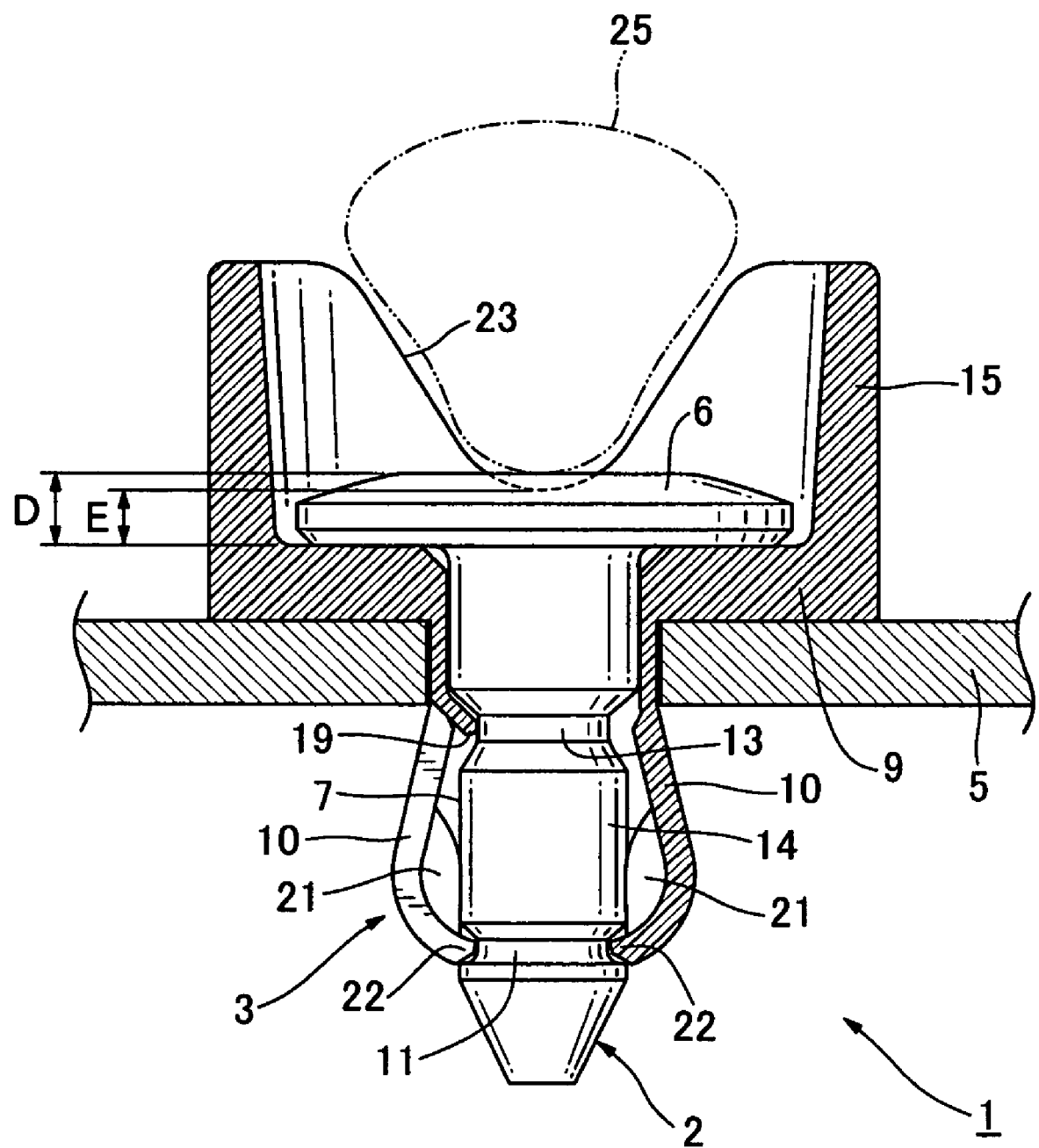

CLIP

CROSS-REFERENCE TO RELATED APPLICATION

This application claims the benefit of Japanese Patent Application No. 2005-016585 filed Jan. 25, 2005, incorporated herein by reference.

BACKGROUND OF THE INVENTION

The present invention relates to a so-called one push-type clip having a pin and a bush and able to connect a plurality of workpieces together, such as panels, by pushing the pin into the bush.

There is a well-know type of clip consisting of a pin and a bush in which a hollow bush shank is inserted into mounting holes of two workpieces such as panels to be connected together, a pin shank is inserted into the hollow bush shank, a portion of the bush shank expands, and the workpieces are connected together by the expanded portion of the bush shank and a bush flange. This clip makes it easy to connect workpieces together by simply inserting the bush shank into the mounting holes in the workpieces and pushing in the pin.

This well-known clip is configured so that the pin and bush are temporarily connected by pushing in the pin shank to a temporary connecting position in the bush shank without causing the bush shank to expand. The bush shank is inserted into a mounting hole in a workpiece such as a panel while the pin and bush are temporarily connected. The clip is also configured so that the pin shank is further inserted into the bush shank to expand the bush shank and establish a permanent connection. This type of clip is sold, stored and used with the pin and bush temporarily connected. Because workpieces can be fixed by simply pushing the pin into the bush one time (with one push), this type of clip is commonly known as a one push-type clip.

A door switch bumper for an automobile has been disclosed in Patent Document 1 (Japanese Unexamined Utility Model Application Publication No. 61-66011) that has a main body and a pin inserted into a leg portion of the main body. The leg portion of the main body of the door switch bumper is inserted into a mounting hole in a door panel, and some of the leg portion expands when the pin is pushed in. The main body is thus permanently attached to the door panel by a base of the main body and the expanded leg portion.

A part mounting device has been disclosed in Patent Document 2 (Japanese Unexamined Patent Application Publication No. 2001-124022) that consists of a hollow female component (bush) with flexible legs to engage a mounting hole in a workpiece and a male component inserted into the female component to keep the flexible legs from bending inwardly. This part mounting device is configured to provide a temporary connection state by pushing the male component into the female component to a position at which it does not prevent the flexible legs from bending inwardly. The flexible legs of the female component in the temporary connection state are then inserted into the mounting hole of a workpiece such as a panel, and the male component is pushed further into the female component to prevent the flexible legs on the female component from bending inward, thereby connecting the device permanently to the workpiece. The part mounting device in Patent Document 2 constitutes a clip that is sold, stored and used in the temporary connection state.

In the door switch bumper of Patent Document 1, the pin is pushed into the main body to attach the main body to a panel, but because the pin is not temporarily connected to the leg portion of the main body, the two components—pin and main body—have to be assembled on site. This type of clip also has to be carefully managed in inventory so that one of the components is not lost.

Because the attachment device in Patent Document 2 is a one push-type clip in which the pin or male component is temporarily connected to the female component (bush), the pin and bush do not have to be assembled on site, and the clip is easy to manage in inventory without loss of one of the components. A certain number of such clips or part mounting devices are usually wrapped together in a single package for sale, and a user transports and uses them in the temporary connection state. However, the packaged clips can collide with each other as they are held and transported, so that some of the pins can be pushed further into the bushes to the permanent connection state. Such clips cannot be used to mount parts to a workpiece. These clips have to be treated as defective and only used after being returned to the temporary connection state. Because it is not easy to determine on-site which delivered clips are in the permanent connection state, a user can waste time attempting to mount the bushes on these clips in mounting holes in workpieces. The result is reduction in productivity and increased expense.

BRIEF DESCRIPTION OF THE INVENTION

An object of the present invention is to provide an improved one-push type clip that minimizes undesired push-in of the pin when the pin and bush are temporarily connected.

In an embodiment of the present invention, a clip comprises a pin having a flange and a shank and a bush having a flange and a hollow shank into which the pin shank is inserted, wherein the clip is configured so that the pin and bush establish a temporary connection state by pushing in the pin shank to a temporary connecting position in the bush shank without causing the bush shank to expand. In this state the bush shank is inserted into a mounting hole in a workpiece such as a panel. The clip is configured so that the pin shank is further inserted into the bush shank to expand a portion of the bush shank and establish a permanent connection, with the workpiece interposed between the expanded portion of the bush shank and the bush flange, to fix the clip to the workpiece. The bush flange has a wall that extends therefrom to about the height of the pin flange when the pin and bush are temporarily connected, thereby to shield the pin flange and the pin shank to keep the pin from being undesirably pushed in further. As a result, the pin cannot be inadvertently pushed further into the bush from the temporary connection position, during transport, for example, even when clips are placed in a package or removed from a package, and even when the clips collide in the package or fall out of the package.

In this clip, the wall is formed in a tubular shape rising from the outer periphery of the bush flange. Preferably, the wall has a notch for receiving a finger or other means for pushing on the pin flange when desired. Preferably, also, the bush shank has a first tab near the bush flange for use in establishing the temporary connection, a protrusion at the tip of the bush shank projecting inward by radially for use in establishing the permanent connection, and a second tab at the tip of the protrusion for use in maintaining the permanent connection. The tip of the pin shank has a recess for engaging the first tab during the temporary connection state and for engaging the second tab during permanent connection.

This clip can be used to mount a curtain shield airbag on a car frame, for example, and because the wall is of a predetermined height, the deployment of the curtain shield airbag can be adjusted.

BRIEF DESCRIPTION OF THE DRAWINGS

The invention will be further described in conjunction with the accompanying drawings, which illustrate a preferred (best mode) embodiment, and wherein:

FIG. 7 is a front view showing the permanent connection state of the clip in FIG. 1, with the bush shown in cross-section.

DETAILED DESCRIPTION OF THE INVENTION

The following is an explanation of an embodiment of the present invention with reference to the drawings.

FIG. 7 shows the clip 1 permanently connected to a workpiece 5 such as a panel. If the workpiece 5 is a plurality of panels, the panels can be connected together by the clip 1. In one example, one panel can be a car body, and the other panel a portion of a component to be mounted on the car body by the clip 1. In another example, the clip 1 can be used to mount a curtain shield airbag to a car frame.

Figure 1:
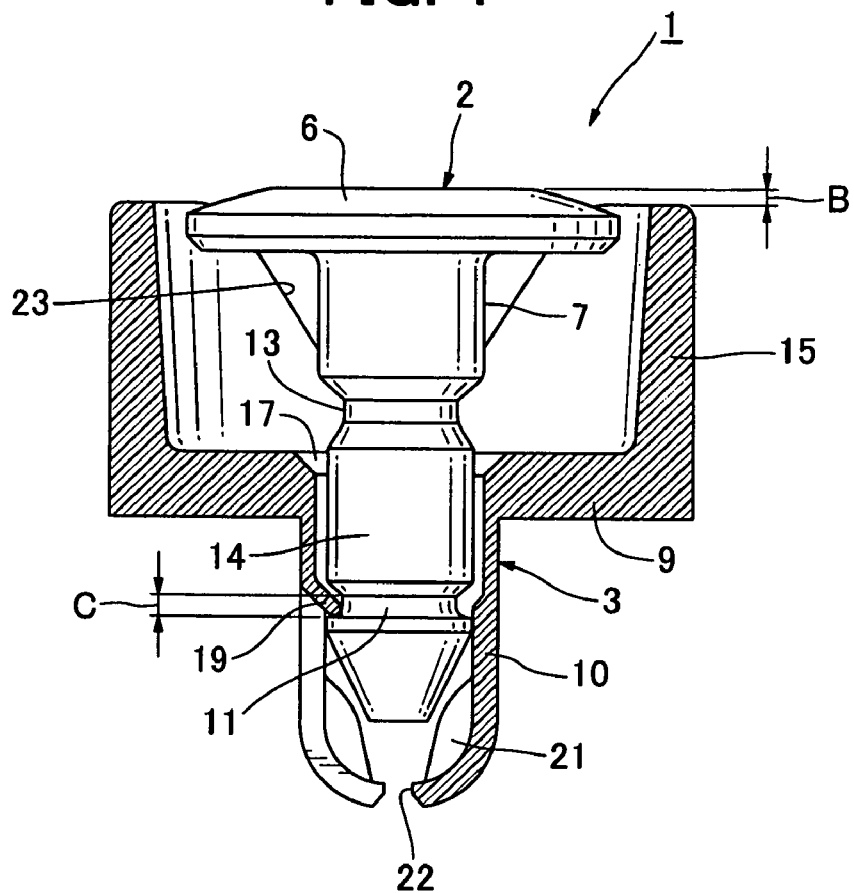
FIG. 1 is a front view showing the temporary connection state of the clip 1 in an example of the present invention, with the bush shown in cross-section.
Figure 2:
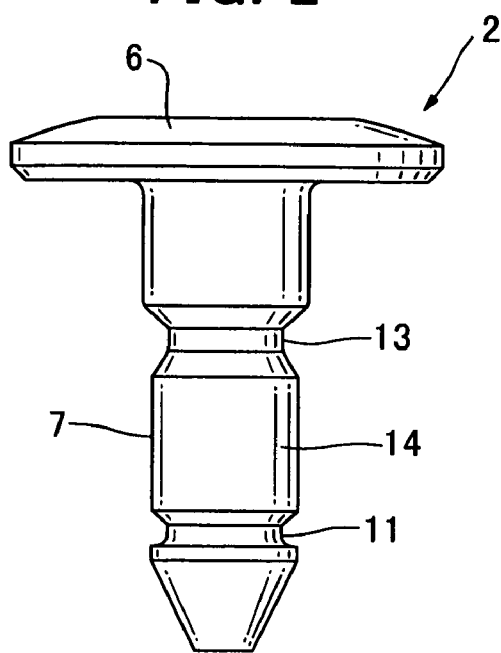
FIG. 2 is a front view of a pin used in the clip in FIG. 1.
Figure 3:
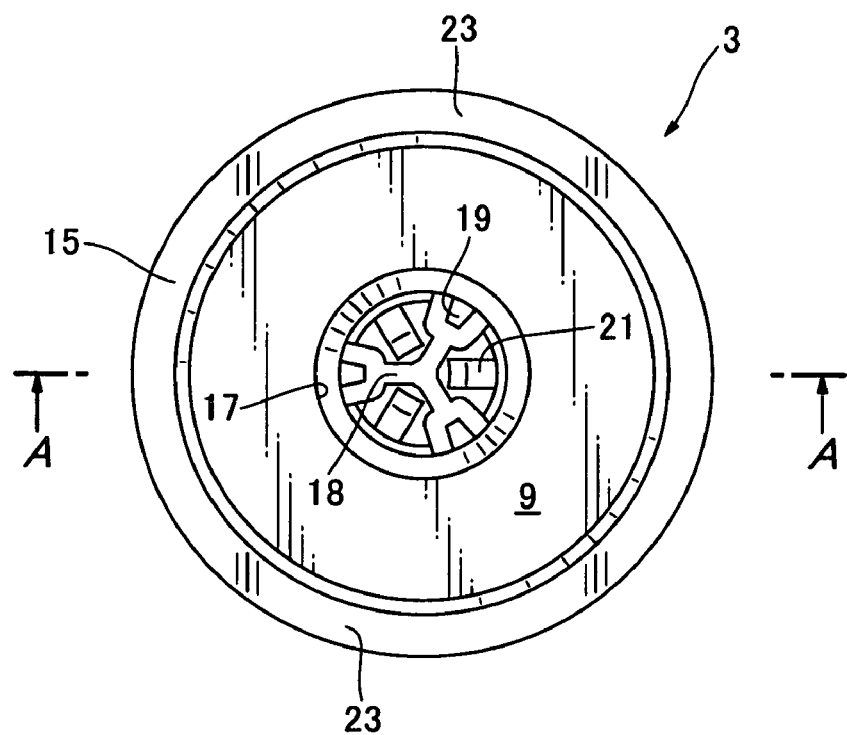
FIG. 3 is a plan view of a bush used in the clip in FIG. 1.
Figure 4:
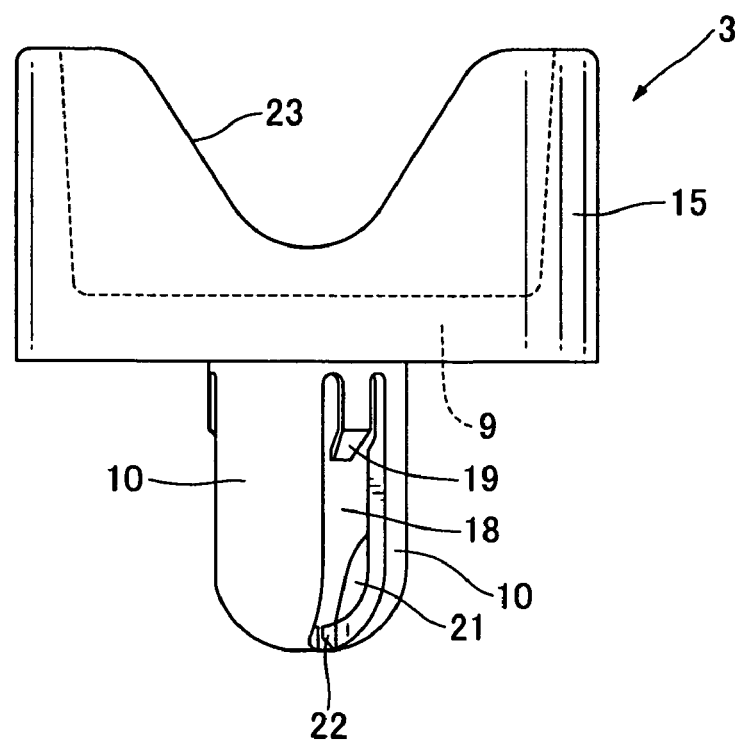
FIG. 4 is a front view of the bush in FIG. 3.
Figure 5:
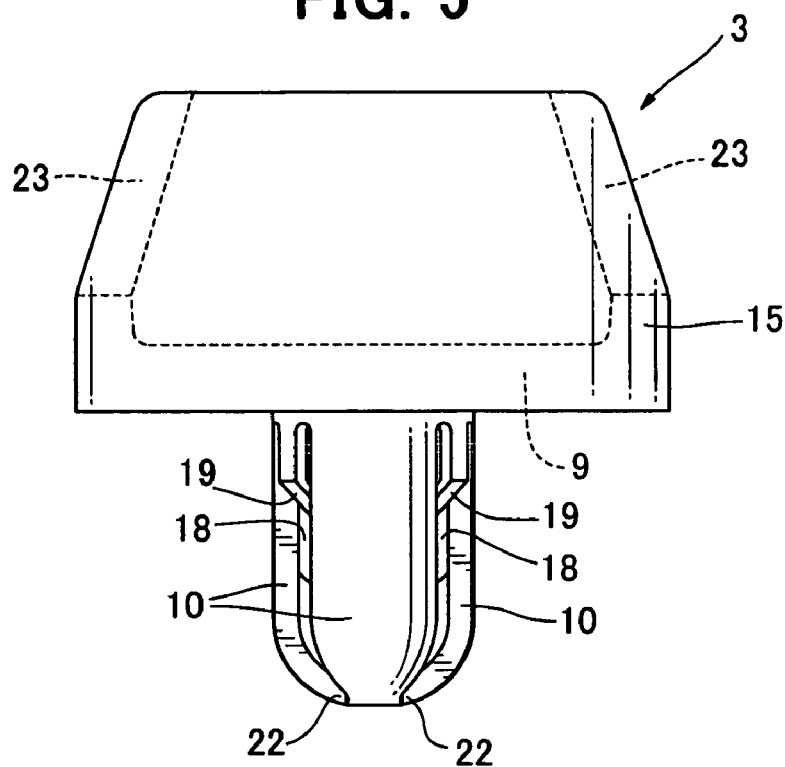
FIG. 5 is a side view of the bush in FIG. 4.

The clip 1 has two components—a pin 2 and a bush 3. Preferably, each of the pin 2 and the bush 3 is an integrally molded plastic component. In the embodiment, the pin 2 and the bush 3 can be connected temporarily so that they do not come apart. Because the clip can be sold and stored by a user with the pin 2 and bush 3 temporarily connected to one another, the pin 2 and the bush 3 do not have to be managed separately in inventory. Usually, a certain number of clips 1 with their components connected together temporarily are placed in a package and transported, sold and stored in this manner. As shown in FIG. 1 and FIG. 2, the pin 2 has a flange 6 and a shank 7 extending from the flange. As shown in FIG. 1 and FIG. 3 through FIG. 6, the bush 3 has a flange 9 and a hollow shank 10 extending from the flange.

The following is a detailed explanation of the configuration of the pin 2 in the embodiment, with reference to FIG. 1 and FIG. 2. The pin flange 6 is preferably in the shape of a round plate. The pin shank 7 is in the shape of a rod extending from the base of the flange 6 to a conical tip (the bottom end in FIG. 2). A first recess 11 is formed near the tip of the pin shank 7 to engage a first tab 19 or tabs (described in detail below) on the bush shank 10 to establish a temporary connection, and to engage a second tab 22 or tabs (described in detail below) on the bush shank 10 to establish a permanent connection. A second recess 13 is formed in the pin shank 7 near the pin flange 6 to receive the first tab 19 of the bush shank 10 during permanent connection of the pin 2 to the bush (see FIG. 7), so that the first tab is relaxed and not bent. This keeps the clip from becoming deformed during permanent connection, and allows it to be reused. A portion of the pin shank between the first recess 11 and the second recess 13 is a wide diameter portion 14, which maintains the rigidity of the pin shank 7 and keeps the bush shank 10 from bending inward radially in the permanent connection state as shown in FIG. 7.

The following is a detailed explanation of the bush 3, with reference to FIG. 3 through FIG. 6. In the embodiment, the bush flange 9 is preferably in the shape of a round plate but has a larger diameter than the pin flange 6. A protection wall 15 extends from the bush flange approximately to the height of the pin flange 6 when the pin 2 and bush 3 are temporarily connected to one another (see FIG. 1) and substantially surrounds and shields the pin flange 6 and the pin shank 7. The wall is described in detail below.

An opening 17 is formed in the center of the bush flange 9 to receive the pin shank 7. The bush shank 10 is hollow and is connected to the opening 17 in order to receive the pin shank 7. A plurality of slits 18 (three in the example shown in the drawings) are formed axially around the periphery of the bush shank 10. Dividing the bush shank makes insertion of the pin shank 7 easier and expansion of the bush shank 10 easier. The inner surface of the bush shank 10 near the bush flange 9 is a base portion. A first tab 19 (three in the example) for establishing a temporary connection is formed where it will not interfere with the expansion of the bush shank 10 and extends inward and towards the tip of the bush shank. The bush shank 10 has a thin wall portion extending from the base near the bush flange 9, and a thick wall portion extending from the thin wall portion to the tip of the bush shank. A curved protrusion 21 (three in the example) is formed inwardly on the thick wall portion. The inward projection of the protrusion 21 in the radial direction allows the shank 10 to bend outward sufficiently when the protrusion comes into contact with the large diameter portion 14 of the pin shank 7 in the permanent connection state (FIG. 7). A second tab 22 (three in the example) for maintaining the permanent connection state is formed near the end of the protrusion 21 in the bush shank 10. The second tab 22 engages the recess 11 in the pin shank 7 to maintain the permanent connection state (FIG. 7).

The wall 15 on the bush flange 9 extends nearly to the height of the pin flange 6 when the pin 2 and bush 3 are temporarily connected (FIG. 1) so that it substantially surrounds the pin flange 6 and pin shank 7. When temporarily connected clips 1 are placed in a package and transported, the wall 15 keeps the pin 2 from being pushed further into the bush 3 beyond its temporary connection position, even when clips collide with one another inside the package or sustain an external shock. In this embodiment, the wall 15 has a round tubular shape rising from the outer edge of the bush flange 9.

The height of the wall 15 is set to keep the pin 2 in its temporary connection position from being undesirably pushed in further. In FIG. 1, the pin flange 6 is set so that the height B of the top of the pin flange 6 from the top of the wall 15 is less than the height C of the first tab 19 on the bush shank 10 maintained in the middle of the recess 11 in the pin shank 7 (B<C). As shown in FIG. 7, a notch 23 is formed in the wall 15 for receiving a finger or other means such as the tip of a screwdriver for pushing the pin flange 6 toward the bush flange 9. The depth of the notch 23 is set so that in the permanent connection state, with the pin flange 6 contacting the bush flange 9, the height E of the bottom of the notch from the surface of the bush flange 9 is less than the height D of the top of the pin flange 6 from the bush flange 9 (E<D). In this way, the pin flange 6 can be reliably pushed in to make contact with the bush flange 9 and establish a reliable permanent connection.

The following is an explanation with reference to FIG. 1 and FIG. 7 of the operation used to fix the clip 1 to a workpiece 5. As shown in FIG. 1, when the pin 2 is inserted in the bush 3, the conical tip of the pin shank 7 engages the first tab 19, deflecting it outward resiliently and then allowing it to snap into the recess 11 as the conical tip moves further into the hollow bush shank 10, thereby to establish temporary connection of the pin 2 to the bush 3 in a temporary connection state. In the temporary connection state, the wall 15 rising from the bush flange 9 substantially surrounds the pin flange 6 and the pin shank 7. The recess 11 is preferably a circumferential groove with an annular surface toward the tip of the pin shank 7 that is substantially perpendicular to the axis of the pin shank and with an annular surface adjacent to the wide diameter portion 14 that tapers outwardly away from the tip of the pin shank. The annular surface of recess 11 toward the tip of the pin shank 7, being substantially flat, acts as an anti-extraction shoulder engaging the first tab 19 during the temporary state, to prevent the pin from being extracted from the bush.

A clip 1 in the temporary connection state is applied to a workpiece 5 by inserting the bush shank 10 into a mounting hole in the workpiece 5 and bringing the bush flange 9 into contact with the workpiece. The pin flange 6 is then pushed in using a finger 25, for example, as shown in FIG. 7. The taper of the surface of the recess 11 adjacent to the wide diameter portion 14 of the pin shank conforms to the angle of the tip portion of the first tab 19. This configuration and the flexibility of the thin-walled tab 19 permit the tab to be released from the recess 11 when the pin flange 6 is pushed toward the bush flange 9 from the temporary connection state shown in FIG. 1. As the pin flange 6 approaches the bush flange 9, the wide diameter portion 14 of the pin flange deflects the tab 19 outwardly, where it remains until it enters the recess 13 in the permanent connection state shown in FIG. 7. The recess 13 is preferably an annular groove with oppositely tapered surfaces as shown in FIG. 7.

By virtue of notch 23 in the wall 15, the pin flange 6 can be pushed in easily, so that the pin flange readily comes into contact with the bush flange 9. When the large diameter portion 14 of the pin shank 7 comes into contact with the protrusions 21 in the bush shank 10, a portion of the bush shank 10 expands resiliently, the workpiece 5 is interposed between the expanded portion of the bush shank 10 and the bush flange 9, and the clip 1 is fixed to the workpiece 5 in the permanent connection state shown in FIG. 7. When a plurality of workpieces 5 are to be connected, the clip 1 connects them to each other. Because the second tab 22 in the bush shank 10 engages the recess 11 in the pin shank 7 in the permanent connection state shown in FIG. 7, the permanent connection state is maintained.

Because the wall 15 is of a predetermined height, the deployment of a curtain shield airbag can be appropriately adjusted when the clip 1 is used to mount the curtain shield airbag.

If it is desired to remove the clip 1 from a workpiece, a tool can be inserted through a notch 23 and under the pin flange 6 to lift the pin flange away from the bush flange 9. The tip of tab 22 is preferably tapered so that lifting of the recess 11 moves the tab 22 outwardly sufficient to clear its engagement with the recess 11, and so that the conical tip of the pin shank 7 can enter the bush shank 10. As the pin flange 6 moves away from the bush flange 9, the tab 19 is disengaged from the recess 13 and is bent outwardly by wide diameter portion 14 until the tab 19 snaps back into the recess 11 in the temporary connection state shown in FIG. 1. Disengagement of the protrusions 21 from the wide diameter portion 14 of the pin shank allows the bush shank to contract, so that the clip in the state shown in FIG. 1 can be withdrawn from a mounting hole in a workpiece.

Figure 6:
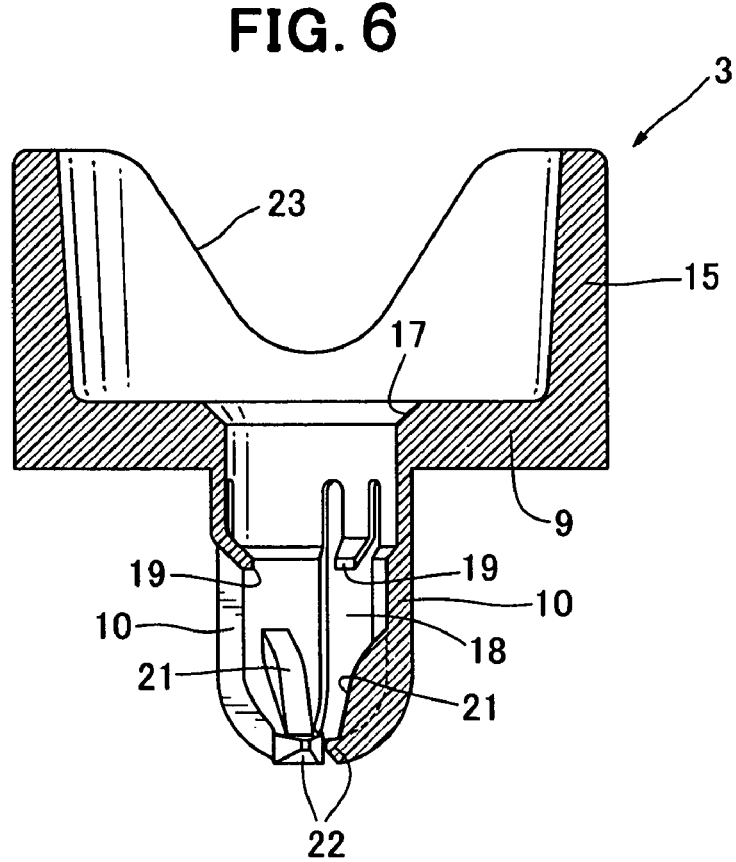
FIG. 6 is a cross-sectional view of the bush from line A-A in FIG. 3.

While a preferred embodiment of the invention has been shown and described, changes can be made without departing from the principles and spirit of the invention, the scope of which is defined in the following claims. For example, although the tabs 19 and 22 in the described embodiment are provided in sets of three tabs equally spaced circumferentially, the number of tabs in each set can vary. The tabs 19 in the embodiment are defined in part by slots in the thin wall portion of the bush shank 10 and are hinged at the base of the thin wall portion adjacent to the bush flange, as shown in FIG. 6, but other arrangements are possible. In the embodiment the protrusions 21 are provided in a set of three, but like the tabs, the number of protrusions can vary. One or more slots 23 in wall 15 may be provided, and the shape of the slots can vary depending upon the implement used to push in the pin to the permanent connection state.

What is claimed is:

1. A clip comprising a pin having a flange and a shank and a bush having a flange and hollow shank into which the pin shank is inserted through an opening in the bush flange, wherein the clip is configured so that the pin and the bush establish a first connection state by pushing the pin shank into the bush shank to a temporary connecting position, so that the bush shank can be inserted into a mounting hole in a workpiece while the clip is in the first connection state, wherein the clip is configured so that the pin and the bush establish a second connection state by pushing the pin shank further into the bush shank, thereby to fix the clip to the workpiece, and wherein the bush flange has a first tubular wall surrounding the opening in the bush flange and extending therefrom in a first direction substantially to the height of the pin flange from the bush flange in the first connection state, so as substantially to surround the pin shank, and the bush shank has a second tubular wall extending from the hole in the bush flange in an opposite direction, wherein the second tubular wall has at least one first tab extending therefrom inwardly of the bush shank at a location near the bush flange, but spaced therefrom toward a tip of the bush shank remote from the bush flange, and wherein the pin shank has a first recess disposed to receive the at least one first tab in the first connection state; and wherein the first tubular wall has a pair of slots on opposite sides of the tubular wall to facilitate pressing the pin flange toward the bush flange.

2. The clip described in claim 1, wherein the first tubular wall rises from an outer periphery of the bush flange.

3. The clip described in claim 1, wherein the clip is constructed for mounting a curtain shield airbag to a car frame.

4. The clip described in claim 1, wherein the pin shank has a second recess disposed to engage the at least one first tab in the second connection state.

5. The clip described in claim 4, wherein the pin shank has a first large diameter portion between the first and second recesses and a second large diameter portion between the second recess and the pin flange, and wherein the recesses have smaller diameters than the large diameter portions.

6. The clip described in claim 5, wherein the bush shank has at least one protrusion extending inwardly of the bush shank from the second tubular wall to engage the second recess in the second connection state.

7. The clip according to claim 4, wherein the pin shank has exactly two recesses.

8. A clip according to claim 1, wherein the pin shank further comprises a second recess which receives the first tab in the second connection state;

wherein the pin comprises first and second wide diameter portions, said first and second wide diameter portions being of greater diameter than the first and second recesses;

wherein the second wide diameter portion is adjacent to the pin flange, the second recess is adjacent to the second wide diameter portion and farther away from the pin flange than the second wide diameter portion, the first wide diameter portion is adjacent to the second recess and farther away from the pin flange than the second recess, and the first recess is adjacent to the first wide diameter portion and farther away from the pin flange than the first wide diameter portion.

9. A clip according to claim 8, wherein the pin further comprises a tip end which is adjacent to the first recess and tapers in a direction away from the pin flange.

10. The clip according to claim 1, wherein, in the first connection state, a top surface of the pin flange extends beyond a top surface of the substantially tubular wall.

11. A clip comprising a pin having a flange and a shank and a bush having a flange and a hollow shank into which the pin shank is inserted through an opening in the bush flange, wherein the pin shank and the bush shank have first connection cooperable parts to connect the pin and the bush temporarily with the pin shank inserted into the bush shank to a temporary connection position, and have second connection cooperable parts to connect the pin to the bush with the pin shank further inserted into the bush to a second connection position, wherein the bush includes a tubular wall which is constructed so as substantially to surround the pin shank when the pin and the bush are temporarily connected, wherein the pin shank has first and second recesses separated by a first portion of the pin shank of greater diameter than the diameter of the recesses, wherein the first connection cooperable parts include the first recess and at least one first tab extending inwardly of the hollow bush shank at a location spaced from the bush flange toward a top of the bush shank, and wherein in the temporary connection position the first portion of the pin shank is located in the opening in the bush flange; and wherein the bush has a pair of slots on opposite sides of the tubular wall to facilitate pressing the pin flange toward the bush flange.

12. The clip described in claim 11 wherein the second connection cooperable parts include the at least one first tab and the second recess.

13. The clip described in claim 11, wherein the pin shank has a second portion of greater diameter than the diameter of the recesses located in the opening in the flange in the second connection position.

14. A clip according to claim 11, wherein the second recess receives the first tab in the second connection state;

wherein the pin shank also comprises a second portion of greater diameter than the diameter of the recesses, the second portion of greater diameter being separated from the first portion of greater diameter;

wherein the second portion is adjacent to the pin flange, the second recess is adjacent to the second portion and farther away from the pin flange than the second portion, the first portion is adjacent to the second recess and farther away from the pin flange than the second recess, and the first recess is adjacent to the first portion and farther away from the pin flange than the first portion; and wherein the pin further comprises a tip end which is adjacent to the first recess and tapers in a direction away from the pin flange.

15. A clip comprising a pin having a flange and a shank and a bush having a flange and a hollow shank into which the pin shank is inserted through an opening in the bush flange, wherein the pin shank and the bush shank have first connection cooperable parts to connect the pin and the bush temporarily with the pin shank inserted into the bush shank to a temporary connection position, and have permanent connection cooperable parts to connect the pin to the bush with the pin shank further inserted into the bush to a second connection position, wherein the bush includes a tubular wall which is constructed so as substantially to surround the pin shank when the pin and the bush are temporarily connected, wherein the first connection cooperable parts include at least one tab extending inwardly of the bush shank and a recess in the pin shank that receives the at least one tab in the temporary connection position, and wherein the at least one tab and the recess are constructed with a mutual fit that resists inadvertent movement of the pin shank in the bush shank toward the second connection position; and wherein the tubular wall has a pair of slots on opposite sides of the tubular wall to facilitate pressing the pin flange toward the bush flange.

16. The clip described in claim 15, wherein the at least one tab is spaced from the bush flange toward a tip of the bush shank, and wherein the pin shank has a portion of greater diameter than the recess that is located in the opening in the bush flange when the pin is in the temporary connection position.

17. A clip comprising:

a pin and a bush;

wherein the bush comprises a flange with a first surface and a second surface opposite the first surface;

wherein a bush shank extends from the first surface of the bush flange and wherein a substantially tubular wall extends from the second surface of the bush flange;

wherein the bush shank comprises a first tab extending radially inward at a first longitudinal location along the bush shank;

wherein the pin comprises a pin flange and a pin shank, the pin shank including first and second recesses;

wherein the pin is configured to be engaged with the bush in a first connection state by inserting the pin shank into the bush shank such that the first tab engages the first recess;

wherein the pin is configured to be engaged with the bush in a second connection state by further inserting the pin shank into the bush shank such that the tab engages the second recess;

wherein the substantially tubular wall has a pair of slots on opposite sides of the tubular wall to facilitate pressing the pin flange toward the bush flange.

18. A clip according to claim 17, wherein in the second connection state the first tab is engaged with the second recess.

19. A clip according to claim 17, wherein the pin comprises a first wide diameter portion adjacent to the pin flange.

20. A clip according to claim 19, wherein the pin comprises a second wide diameter portion which is separated from the first wide diameter portion by the second recess.

21. A clip according to claim 20, wherein the first recess is located adjacent to the second wide diameter portion at an end of the second wide diameter portion farthest away from the pin flange; and wherein the pin further comprises a tapered tip end adjacent to the first recess.

22. A clip according to claim 21, wherein the pin includes exactly two recesses.

23. The clip according to claim 17, wherein, in the first connection state, a top surface of the pin flange extends beyond a top surface of the substantially tubular wall.

* * * * *